United States Patent [19]

Hu et al.

[11] Patent Number: 5,817,252

[45] Date of Patent: Oct. 6, 1998

[54] DEICING AND ANTI-ICING COMPOSITION FOR AIRCRAFT

[75] Inventors: Joseph Zhen Hu, Woodside, N.Y.; John Wakelin, Mooresville, Ind.; Arnold Wiesenfeld, Mahwah, N.J.

[73] Assignee: Octagon Process Inc., Edgewater, N.J.

[21] Appl. No.: 837,999

[22] Filed: Apr. 16, 1997

[51] Int. Cl.$^6$ ....................................................... C09K 3/18
[52] U.S. Cl. ............................................... 252/70; 106/13
[58] Field of Search ................................. 106/13; 252/70

[56] References Cited

U.S. PATENT DOCUMENTS

| | | | |
|---|---|---|---|
| 4,358,389 | 11/1982 | König-Lumer et al. | 106/13 |
| 4,698,172 | 10/1987 | Tye et al. | 106/13 |
| 4,744,913 | 5/1988 | Salvador et al. | 106/13 |
| 4,954,279 | 9/1990 | Ma et al. | 106/13 |
| 5,118,435 | 6/1992 | Nieh | 106/13 |
| 5,268,117 | 12/1993 | Fusiak et al. | 252/70 |
| 5,273,673 | 12/1993 | Ashrawi et al. | 106/13 |
| 5,334,323 | 8/1994 | Schrimpf et al. | 252/70 |
| 5,389,276 | 2/1995 | Coffey et al. | 106/13 |
| 5,461,100 | 10/1995 | Jenkins et al. | 106/13 |

FOREIGN PATENT DOCUMENTS 555002 8/1993 European Pat. Off. ................. 106/13

OTHER PUBLICATIONS

Chemical Abstract No. 109:24348 which is an abstract of European Patent Specification No. 257,720 (Mar. 1988).

*Primary Examiner*—Anthony Green
*Attorney, Agent, or Firm*—Ezra Sutton

[57] ABSTRACT

A deicing and anti-icing composition for aircraft surfaces including a base compound being propylene glycol and/or ethylene glycol in the range of 35.0% to 80.0% by weight of the deicing and anti-icing composition. A diluent is included in the form of water for use as a carrier fluid for the glycol. A first molecular weight non-ionic surfactant agent is included having an HLB in the range of 4 to 17, and a second molecular weight non-ionic surfactant agent is included having an HLB in the range of 5 to 18. The second non-ionic surfactant agent has an HLB at least two (2) units higher than the first non-ionic surfactant agent. An emulsifier is included in the form of a polycarboxylate compound being in the range of 1 ppm to 0.5% by weight of the deicing and anti-icing composition. A pH control agent maintains the pH of the deicing and anti-icing composition between a 6 and 10 value.

51 Claims, No Drawings

DEICING AND ANTI-ICING COMPOSITION FOR AIRCRAFT

FIELD OF THE INVENTION

The present invention relates to a new and improved deicing/anti-icing fluid composition primarily for use on aircraft surfaces. More particularly the deicing/anti-icing composition is a single phase fluid having a low diffusion rate to retard the onset and progression of freezing of water on the treated surfaces during periods of precipitation.

BACKGROUND OF THE INVENTION

Deicing fluids are used to remove frozen, or partially frozen, deposits of ice and snow from surfaces which are required to be free from such contamination. Anti-icing fluids prevent, for a limited time, the refreezing of water on treated surfaces. Both types of fluid are well known in the art. It is necessary for ongoing airport operations, during periods of freezing precipitation, to apply deicing/anti-icing fluids. The longer the time interval from when the anti-icing fluid is applied to a freshly decontaminated surface, until the onset of re-freezing on that surface, the greater the advantage to the user. The standard method of assessing this time delay is the Water Spray Endurance Test (WSET), which is fully described in an appendix to the SAE/AMS 1428.

Prior art anti-icing fluids rely heavily upon thickening polymers to achieve performance, and have apparent viscosities in the range 15,000 to 55,000 mPas. when measured at 20° C. This inherent thickness lays down a thick layer. It is this volume thickness of glycol which is the greatest contributor to retarding the onset of re-freezing. Times achieved by prior art fluids range from 30 to 130 minutes. (The present minimum standard for advanced fluids is 80 minutes).

DESCRIPTION OF THE PRIOR ART

Deicing and anti-icing fluid compositions for aircraft surfaces have been disclosed in the prior art. For example, U.S. Pat. No. 4,954,279 to Ma et al discloses an aircraft deicing and anti-icing composition. The composition includes a microemulsion of oil in a water/glycol solution having thickening agents, emulsifiers being substantially water-insoluble, and alkanolamines to provide a composition having effective deicing and anti-icing properties. This prior art patent does not disclose the chemical composition nor the chemical mechanism for operation of the deicer and anti-icer fluid of the present invention.

U.S. Pat. No. 5,118,435 to Nieh discloses anti-icing compositions containing thickener blends having a polyacrylic acid and a copolymer of acrylic acid and a hydrophobic vinyl monomer for use on aircraft wing surfaces. These compositions retain a high viscosity, even when diluted with water and exhibit a highly pseudo plastic rheology indicating desirable flow off characteristics. This prior art patent does not disclose the chemical composition nor the chemical mechanism for operation of the deicer and anti-icer fluid of the present invention.

U.S. Pat. No. 5,268,117 to Fusiak et al discloses a non-flammable, pseudo-plastic deicing composition for use on exposed surfaces of aircraft. The composition includes a glycol based anti-icing fluid containing a 0.2 to 1.0% crosslinked poly (N-vinylpyrrolidone) being used as the major polymer additive in the range of 0.05% to 5% by weight; and an aqueous $C_2$ to $C_3$ alkylene glycol in the range of 95% to 99.5% by weight. This prior art patent does not disclose the chemical composition nor the chemical mechanism for operation of the deicer and anti-icer fluid of the present invention.

U.S. Pat. No. 5,273,673 to Ashrawi et al discloses anti-icing compositions having an alkylphenol ethoxylate nonionic surfactant and an alkylaryl sulfonate hydrotrope therein being used on aircraft wing surfaces. In addition, the anti-icing compositions use thickeners containing a blend of a polyacrylic acid and a copolymer of polyacrylic acid with a vinyl monomer where the copolymer acts as a thickener modifier. This prior art patent does not disclose the chemical composition nor the chemical mechanism for operation of the deicer and anti-icer fluid of the present invention.

U.S. Pat. No. 5,334,323 to Schrimpf et al discloses deicing or anti-icing fluids for aircrafts. These fluid compositions include glycols, a crosslinked polyacrylic acid, a nonionic surfactant based on alkoxylated $C_{10}$ to $C_{20}$ alcohols, corrosion inhibitors, a mixture of NaOH and KOH, an antioxidant and water. This prior art patent does not disclose the chemical composition nor the chemical mechanism for operation of the deicer and anti-icer fluid of the present invention.

U.S. Pat. No. 5,461,100 to Jenkins et al discloses aircraft deicing/anti-icing fluid including a glycol-based aqueous solution thickened with a macromonomer containing polymer in an amount of less than about 5% by weight. This prior art patent does not disclose the chemical composition nor the chemical mechanism for operation of the deicer and anti-icer fluid of the present invention.

None of the aforementioned prior art patents teach or disclose a chemical composition having a distinct chemical mechanism for retarding the onset of re-freezing of water on the surface of the protective film of anti-icing fluid as the present invention does.

Accordingly it is an object of the present invention to teach and define an improved deicing and anti-icing fluid composition having a chemical mechanism to control the diffusion of water and thereby retard the onset of re-freezing of water on the surface of an applied film of anti-icing fluid.

Another object of the present invention is to provide a chemical composition having a distinct chemical mechanism for retarding the onset of re-freezing of water on the surface of the protective film of anti-icing fluid when applied to aircraft surfaces.

Another object of the present invention is to provide a fluid composition which does not solely rely upon the use of a thickening polymer, or polymers, to achieve its objective.

SUMMARY OF THE INVENTION

It should be understood the fluids described in the present invention and those illustrated by example herein are considered ready to use anti-icing fluids and may be used by dilution with water to any extent, the dilution being dependent upon the operating conditions which need to be satisfied.

In accordance with the present invention there is provided a deicing and anti-icing fluid composition, primarily for use on aircraft surfaces, being a compound containing propylene glycol in the overall range of 35.0% to 55.0% by weight of the fluid composition, with a preferred range of 51.0% to 52.0% by weight of the fluid composition. A further embodiment is a compound containing ethylene glycol in the overall range of 35.0% to 80.0% by weight of the fluid composition, with a preferred range of 59.0% to 63.0% by weight of the fluid composition. Another embodiment is a compound containing an infinitely variable combination of propylene and ethylene glycols such that the combined glycol content is in the range of 35.0% to 80.0% by weight of the fluid composition, with a preferred range of 45.0% to 65.0% by weight of the fluid composition.

The remainder of the primary, propylene glycol based composition includes water in the overall range of 44.0% to 63.0% by weight of the fluid composition with a preferred range of 47.0% to 49.0% by weight of the fluid composition.

The fluid composition also includes a first lower molecular weight non-ionic surface active agent having an HLB in the overall range of 4 to 17 with a preferred HLB range of 4 to 9; and used in a weight proportion where the overall range is 1 ppm to 0.5% by weight of the fluid composition.

The fluid composition also includes a second higher molecular weight non-ionic surface active agent having an HLB in the overall range of 5 to 18 with a preferred HLB range of 13 to 18; and used in a weight proportion where the overall range is 1 ppm to 0.5% by weight of the deicing and anti-icing composition. The second non-ionic surfactant agent has an HLB at least two (2) units higher than the first non-ionic surfactant agent.

The fluid composition also includes an emulsifier in the form of a polycarboxylate compound being in the overall range of 1 ppm to 0.5% by weight of the fluid composition.

The fluid composition also includes a pH control agent for adjusting the pH of the deicing and anti-icing composition between a 6 and 10 value; and used in a weight proportion where the overall range is 1 ppm to 1.0% by weight of the deicing and anti-icing composition.

DETAILED DESCRIPTION OF THE PREFERRED EMBODIMENT

The preferred embodiment of the composition is propylene glycol by itself as the freeze point depressant in the base compound; and the alternate embodiments include the use of ethylene glycol by itself as the base of the compound in place of the propylene glycol; or a combination of ethylene glycol and propylene glycol as the combined base of the compound in place of the propylene glycol of the preferred embodiment. In the present invention, the preferred and alternate embodiments of the deicing and anti-icing fluid compositions are as follows:

| Component Compound | % Component Weight |
| --- | --- |
| I. Deicing/anti-icing base compound | |
| a) propylene glycol or | 35% to 50% |
| b) ethylene glycol or | 35% to 80% |
| c) a combination of propylene glycol and ethylene glycol | 35% to 80% |
| II. Water. | 20% to 65% |
| III. Surface active agents or surfactants in the form of: | |
| A. A nonionic surfactant having an HLB in the overall range of 4 to 17 with a preferred range of 4 to 9 which include compounds such as the alkoxylated derivatives of alcohols, alkylphenols, amines and fatty acids; propylene oxide and ethylene oxide block polymers; and the equivalents thereof. | 1 ppm to 0.5% |
| B. A nonionic surfactant having HLB in the overall range of 5 to 18 with a preferred range of 13 to 18 which include compounds such as the alkoxylated derivatives of alcohols, alkylphenols, amines and fatty acids; propylene oxide and ethylene oxide block polymers; and the equivalents thereof. | 1 ppm to 0.5% |
| a) Alkoxylated (ethoxylated and/or propoxylated) alcohol derivatives. Example of these compounds are as follows: i) lauryl alcohol + 4 moles of ethylene oxide ii) oleyl alcohol + 12 moles of ethylene oxide iii) castor oil + 5 moles of ethylene oxide iv) sorbitan monolaurate + 4 moles of ethylene oxide v) stearyl alcohol + 2 moles of propylene oxide vi) glyceryl laurate + 23 moles of ethylene oxide General formula for an alcohol ethoxylate is: $C_nH_{(2n+1)}O - (C_2H_4O)_x - H$ where $n = \geq 1$ $x = $ moles of EO $\leq 1$ also $C_nH_{(2n-1)}O$ can be substituted in the above formula. | |
| b) Alkoxylated (ethoxylated and/or propoxylated) alkylphenol derivatives. Examples of these compounds are as follows: i) Nonylphenol + 10 moles of ethylene oxide ii) Octylphenol + 6 moles of ethylene oxide iii) Dodecylphenol + 10 moles of ethylene oxide iv) Dinonylphenol + 8 moles of ethylene oxide v) Octylphenol + 4 moles of propylene oxide General formula for an alkylphenol ethoxylate is: $R^1R^2C_6H_3-O-(CH_2CH_2O)_x - H$ where $R^1$ is $C_nH_{(2n+1)}$ where $n = \geq 1$ $R^2$ is $C_nH_{(2n+1)}$ or H $x = $ moles of EO $\geq 1$ | |
| c) Alkoxylated (ethoxylated and/or propoxylated) amine derivatives. Example of these compounds are as follows: i) Stearyl amine + 2 moles of ethylene oxide ii) Tallow amine + 10 moles of ethylene oxide iii) Soya amine + 4 moles of ethylene oxide iv) Cocomonoethanol amine + 5 moles of ethylene oxide v) Cocoamine + 3 moles of propylene oxide vi) Laurylamine + 5 moles of ethylene oxide General formula for an amine ethoxylated is: | |

$$R^1N \diagdown \begin{matrix}(C_2H_4O)_x - H \\ (C_2H_4O)_y - H\end{matrix}$$

where $R^1 = C_nH_{(2n+1)}$ or $C_nH_{(2n-1)}$
$x = $ moles of EO $\geq 1$
$y = $ moles of EO $\geq 1$ d) Alkoxylated (ethoxylated and/or propoxylated) fatty acid derivatives. Example of these compounds are as follows:
i) Stearic acid + 40 moles of ethylene oxide
ii) Oleic acid + 10 moles of ethylene oxide
iii) Tall oil fatty acids + 7 moles of ethylene oxide
iv) Coco fatty acid + 4 moles of ethylene oxide
v) Lauric acid + 12 moles of propylene oxide
vi) Hydroxystearic acid + 2 moles of ethylene oxide
General formula for a fatty acid ethoxylate is:

$$R^1 - \overset{O}{\underset{\|}{C}} - O - (C_2H_4O)_x - H$$

where $R^1 = C_nH_{(2n+1)}$ or $C_nH_{(2n-1)}$
$n = 5$ to $17$
$x = \geq 1$ moles of EO e) Propylene oxide and ethylene oxide block polymers. Example of these compounds are as follows:
i) Antarox PGP ™
ii) Macol 22 ™
iii) Nonionic R Series ™
iv) Pluronic P ™
v) Tetronil R ™

| | |
| --- | --- |
| IV. An emulsifier compound such as a polycarboxylate. | 1 ppm to 0.5% |
| V. pH control agents such as potassium hydroxide, sodium hydroxide, | 1 ppm to 1.0% |

-continued

| Component Compound | % Component Weight |
|---|---|
| dipotassium phosphate, organic amine bases, tolytriazole, benzotriazole and the equivalents thereof. | |

The deicing and anti-icing composition for aircraft of the present invention includes a base compound such as propylene glycol and/or ethylene glycol as the primary deicer/anti-icer component for depressing the freezing point of water. The propylene glycol component is in the overall range of 35.0% to 55.0% by weight of the deicing/anti-icing composition with a preferred range of 51.0% to 52.0% by weight of the deicing/anti-icing composition. The ethylene glycol component is in the overall range of 35% to 80% by weight of the deicing/anti-icing composition with a preferred range of 59% to 63% by weight of the deicing/anti-icing composition. The combination of propylene glycol and ethylene glycol is in the overall range of 35% to 80% by weight of the deicing and anti-icing composition with a preferred range of 45.0% to 65.0% by weight of the deicing and anti-icing composition.

The other primary ingredient of the compound is water which is the carrier fluid for the propylene glycol or ethylene glycol or the blend of ethylene and propylene glycol. The amount of water used in the composition having propylene glycol is in the overall range of 44.0% to 65.0% by weight of the composition, with a preferred range of 47.0% to 49.0% by weight of the composition. Alternatively, the water used in the composition having ethylene glycol only is in the overall range of 20% to 65% by weight of the composition, with a preferred range of 37.0% to 41.0% by weight of the composition. The water used in the composition having both ethylene glycol and propylene glycol therein, has the diluent water in an overall range of 20.0% to 65.0% by weight of the composition, with a preferred range of 35.0% to 65.0% by weight of the composition.

The surfactant used in the present invention includes a mixture of two types of non-ionic surfactants having an HLB range between 4 and 18. HLB is defined as the hydrophilic lipophilic balance (HLB) such that the higher the HLB the greater the water compatibility. The first lower molecular weight non-ionic surfactant has an HLB in the overall range of 4 to 17 with a preferred range of 4 to 9 and is used in the following weight proportion where the overall range is 1 ppm to 0.5% by weight of the deicing/anti-icing composition. The second higher molecular weight non-ionic surfactant has an HLB in the overall range of 5 to 18 with a preferred range of 13 to 18; and is used in the following weight proportion where the overall range is 1 ppm to 0.5% by weight of the deicing/anti-icing composition. The second non-ionic surfactant has an HLB at least 2 units different (higher) than the first non-ionic surfactant.

Both types of nonionic surfactants include compounds such as the alkoxylated (ethoxylated and/or propoxylated) derivatives of alcohols, alkylphenols, amines, and fatty acids; propylene oxide and ethylene oxide block polymers; and the equivalents thereof. Examples of alkoxylated derivatives have been listed in the composition table above.

The emulsifier is in the form of a polycarboxylate compound. The polycarboxylate emulsifier has a molecular weight between 500,000 to 3,000,000. The amount of polycarboxylate emulsifier used in the composition of the present invention is in the overall range of 1 ppm to 0.5% by weight of the deicing/anti-icing composition.

The present invention uses a pH control agent to adjust and maintain the pH of the deicing and anti-icing composition between is a value of 6 and 10. pH control agents include such compounds as potassium hydroxide, sodium hydroxide, dipotassium phosphate, organic amine bases, tolytriazole, benzotriazole and equivalents thereof. The amount of pH control agents used in the composition of the present invention is in the overall range of 1 ppm to 1.0% by weight of the deicing/anti-icing composition.

The deicing and anti-icing composition can be either alkaline or acidic depending upon the total chemical composition of all additives and the required compounds included in the deicer and anti-icer system. If alkaline the pH value will be in the range of 7.01 to 10; and if acidic the pH value will be in the range of 6.00 to 6.99.

The fluid composition of the preferred embodiment may also contain one or more component compounds having properties of anti-corrosion, anti-foam, non-flammability, water hardness control and a colorant dye within the liquid composition.

Anti-corrosion compounds may be selected from the group consisting of tolytriazole, benzotriazole, alkoxylated butynediol, thiourea, propargyl alcohol, sodium nitrate, butyne-1,4 diol and equivalents and combinations thereof being in the range of 1 pm to 1.0% by weight of the deicer/anti-icer composition.

Anti-foam agents are silicone oil-based defoamers. Examples of silicone defoamers are SAG1000™, Siltech E-2202™, AF-9020™, DC 1520 Silicone anti-foam™, and equivalents thereof being in the range of 1 ppm to 0.5% by weight of the deicer/anti-icer composition.

Non-flammability agents may be selected from the group consisting of tolytriazole or benzotriazole being in the range of 1 ppm to 1.0% by weight of the deicer/anti-icer composition. The non-flammability agent is used to further depress the ignition or flash point of the deicing and anti-icing composition.

Water hardness control agents may be selected from the group consisting of sodium EDTA, sodium HEEDTA, tolytriazole, benzotriazole, sodium polyphosphates, sodium NTA, sodium pyrophosphate, and equivalents thereof being in the range of 1 ppm to 1.0% by weight of the deicer/anti-icer composition.

Color dye identification components such as a water-soluble dye that includes a Type I: red-orange, a Type II: colorless to straw and a Type IV: green being in the range of 10 ppb to 0.1% by weight of the deicer/anti-icer composition.

Based on observation, this combination of ingredients in the weight proportions used apparently controls the diffusion rate of water into and throughout a thin film of the composition mixture, thereby retarding the onset and progression of freezing. In particular, the combination of the non-ionic surfactants and polycarboxylic surfactant used in the composition act to control the diffusion rate of water into and throughout the deicing and anti-icing system of the present invention.

The length of time it takes for freezing to occur on a particular surface during precipitous conditions is known as the WSET time, or commonly referred to as the "Holdover" time. The Water Spray Endurance Test (WSET), as described in Appendix A of the Aerospace Material Specification (AMS) 1428 latest version, is an internationally recognized method to monitor and test for this time interval between application of an anti-icing product, and the onset of freezing condition.

Based upon experimental observation any mixture of propylene glycol and/or ethylene glycol and water absorbs and diffuses the added moisture. When the glycol is diluted enough, freezing occurs. When diffusion is rapid, freezing occurs quickly. When diffusion is severely retarded, non-diffused water collects on the surface and freezes. When the nonionic surfactants and emulsifier are added to the glycol and water, they slow down the diffusing rate (movement) of the water into and throughout the fluid, and the time it takes until the onset of re-freezing occurs is substantially increased. If the material is thickened, as described in prior art, the time for freezing (WSET) is extended by virtue of increased glycol volume. If the diffusion rate is controlled, as in the present invention, then a thin film of the present invention exhibits a greatly extended WSET time.

OPERATION OF THE PRESENT INVENTION

Procedure for compounding 1 kg of each of the examples are as follows: In compounding Example 1 the technician uses a 1500 ml beaker equipped with a mechanical stirrer, and adds 185 grams of water, and with the stirrer running, adds 1.84 grams of the polycarboxylate emulsifier and then stirs for 1 hour. To the beaker is then added 550 grams of propylene glycol and further mixed for 5 minutes. As shown in Table 1, the percentage of propylene glycol by weight is 55%. Next, to the beaker is added 1.71 grams of octylphenol 3 mole ethoxylate and mixed 5 minutes. The technician then adds 260.6 grams of water and mixes for 5 minutes. Then 0.12 grams of nonylphenol 12 mole ethoxylate are added and incorporated into the 1500 ml beaker and further mixed for 5 minutes. The composition mixture is then adjusted to a pH (neat) value between 6 to 8 with potassium hydroxide. Examples 2 and 3 were prepared in a similar manner, except for the addition of the second water amount which is adjusted to accommodate formula variations. As shown in Table 1, the percentage of propylene glycol by weight for Example 2 is 51% and for Example 3 is 38%.

In compounding Example 4 the technician uses a 1500 ml beaker equipped with a mechanical stirrer, and adds 447 grams of water; and with the stirrer running, adds 2.3 grams of Carbopol™ 1610 thickening polymer and then stirs for 2 hours. The mixture is allowed to stand in the covered beaker overnight. The next day, the technician adds 550 grams of propylene glycol and mixes for 5 minutes. As shown in Table 1, the percentage of propylene glycol by weight is 55%. The composition mixture is then adjusted to a pH (neat) value between 6 to 8 with potassium hydroxide. Examples 5 and 6 were prepared in a similar manner; where the water amount being added is adjusted to accommodate formula variations. As shown in Table 1, the percentage of propylene glycol by weight for Example 5 is 51% and for Example 6 is 38%.

In compounding Example 7 the technician uses a 1500 ml beaker equipped with a stirrer, and adds 510 grams of propylene glycol. The stirrer is then started and 15 grams of pine oil is added and mixed for 10 minutes. As shown in Table 1, the percentage of propylene glycol by weight is 51%. Next, 475 grams of water is added to the beaker and mixed for 10 minutes.

In compounding Example 8 the technician uses a 1500 ml beaker equipped with a stirrer, and adds 510 grams of propylene glycol and 490 grams of water to the beaker, then mixes for 10 minutes. As shown in Table 1, the percentage of propylene glycol by weight is 51%.

In compounding Example 9 the technician uses a 1500 ml beaker equipped with a mechanical stirrer, and adds 195.63 grams of water, and with the stirrer running, adds 1.84 grams of the polycarboxylate emulsifier and then stirs for one hour. To the beaker is added 0.12 grams of nonylphenol 12 mole ethoxylate and mixed for 5 minutes. The technician then adds 800 grams of ethylene glycol to the beaker and further mixes for 5 minutes. As shown in Table 3, the percentage of ethylene glycol by weight is 80%. Next, to the beaker is added 1.71 grams of octylphenol 3 mole ethoxylate and further mixed for 5 minutes. The composition mixture is then adjusted to a pH (neat) between 6 to 8 with potassium hydroxide. Examples 10 to 14 were prepared by diluting Example 9 with water to make the targeted percentage of ethylene glycol for each example used. As shown in Table 3, the percentage of ethylene glycol by weight for Example 10 is 65%, for Example 11 is 60%, for Example 12 is 55%, for Example 13 is 50% and for Example 14 is 35%.

In compounding Example 15 the technician uses a 1500 ml beaker equipped with a mechanical stirrer, and adds 185 grams of water; and with the stirrer running, adds 1.84 grams of the polycarboxylate emulsifier and then stirs for 1 hour. To the beaker is then added 100 grams of propylene glycol and further mixed for 5 minutes. Next, to the beaker is added 1.71 grams of octylphenol 3 mole ethoxylate and mixed for 5 minutes. To the beaker is then added 400 grams of ethylene glycol and further mixed for 5 minutes. As shown in Table 4, the percentage of blend for Example 15 is propylene glycol at 10% by weight and ethylene glycol at 40% by weight. The technician then adds 310.6 grams of a second amount of water being mixed for 5 minutes. Then 0.12 grams of nonylphenol 12 mole ethoxylate is added and incorporated into the 1500 ml beaker and further mixed for 5 minutes. The composition mixture is then adjusted to a pH (neat) value between 6 to 8 with potassium hydroxide. Examples 16 to 21 are made in a similar manner except the amounts of propylene glycol and ethylene glycol used is consistent with the percentages shown for each example. As shown in Table 4, the percentage of blend for Example 16 is propylene glycol at 20.0% by weight and ethylene glycol at 30.0% by weight; blend for Example 17 is propylene glycol at 30.0% by weight and ethylene glycol at 20.0% by weight; blend for Example 18 is propylene glycol at 40.0% by weight and ethylene glycol at 10.0% by weight; blend for Example 19 is propylene glycol at 34.0% by weight and ethylene glycol at 1.0% by weight; blend for Example 20 is propylene glycol at 1.0% by weight and ethylene glycol at 34.0% by weight; and blend for Example 21 is propylene glycol at 1.0% by weight and ethylene glycol at 79.0% by weight.

TABLE 1

| COMPONENT COMPOSITION | Example 1 | Example 2 | Example 3 | Example 4 | Example 5 | Example 6 | Example 7 | Example 8 |
|---|---|---|---|---|---|---|---|---|
| | % COMPONENT WEIGHT | | | | | | | |
| Propylene Glycol | 55 | 51 | 38 | 55 | 51 | 38 | 51 | 51 |
| Water | 44.5 | 48.5 | 61.5 | 44.5 | 48.5 | 61.5 | 48.5 | 48.5 |
| Lower MW nonionic | 0.171 | 0.171 | 0.128 | — | — | — | — | — |
| Higher MW nonionic | 0.012 | 0.012 | 0.009 | — | — | — | — | — |
| Polycarboxylate | 0.184 | 0.184 | 0.138 | — | — | — | — | — |

TABLE 1-continued

| COMPONENT COMPOSITION | Example 1 | Example 2 | Example 3 | Example 4 | Example 5 | Example 6 | Example 7 | Example 8 |
|---|---|---|---|---|---|---|---|---|
| Carbopol Thickener 1610 | — | — | — | 0.23 | 0.23 | 0.17 | — | — |
| Pine Oil | — | — | — | — | — | — | 1.5 | — |
| Potassium Hydroxide | * | * | * | * | * | * | * | * |
| WSET (in minutes) | 80 | 140 | 100 | 35 | 35 | 25 | 3 | 6 |

* Potassium hydroxide is added "as needed" to adjust the pH to a value between 6 to 8.

In Table 1 above, Examples 4 through 8 illustrate the practice of a deicing and anti-icing composition in the prior art. Examples 1, 2, and 3 illustrate the practice of the present invention. The WSET was performed on each example in accordance with the AMS 1428 testing procedure and the results summarized in Table 1. Examples 1 to 8 were prepared to pre-subscribed formulas as presented in Table 1.

As shown in Table 1, Examples 1, 2, and 3 illustrate the present invention with Example 3 being a 75:25 dilution of example 2; and with the WSET times ranging from 80 to 140 minutes. Examples 4, 5, and 6 illustrate the prior art using a thickening polymer. Mixtures were made having propylene glycol contents like examples 1, 2, and 3, but the WSET times are only 25 to 35 minutes. Example 7 uses pine oil to retard diffusion into the surface and has a WSET of only 3 minutes. Example 8 has nothing to prevent rapid diffusion and its also freezes rapidly in only 6 minutes. A sample of example 2 with a viscosity of about 1,000 cps versus 15,000–55,000 for examples 4, 5, and 6, had a WSET of 140 minutes, proving that the extended holdover times are due to the unique formulation of the present invention and are not viscosity related.

The composition of the present invention does not rely on thickening polymers. The unique surfactant system of the present invention delays the onset of freezing as shown in Table 2 below.

TABLE 2

| % Propylene Glycol | Example No. | Present Invention | Example No. | Prior Art |
|---|---|---|---|---|
| 55% | 1 | 80 min | 4 | 30–35 min |
| 51% | 2 | 140 min | 5 | 30–35 min |
| 38% | 3 | 100 min | 6 | 20–30 min |

Two rectangular sheets of aluminum four inches (4") by eighteen inches (18") were raised at one end such that the panels made a 10° angle with the horizontal surface. On the first panel a sample of Example 2 was poured and on the second panel a sample of Example 5 was poured. After 5 minutes the thickness of each fluid was measured using a wet film thickness gauge. The fluid film of Example 2 was 20–22 mils thick and the fluid film of Example 5 was 40–44 mils thick. Thus, about half the amount of fluid Example 2 is needed to cover a surface than using Example 5, showing that the performance is due to the unique composition rather than volume thickness.

As shown in Table 3, Examples 9 to 14 show that the present invention system of surfactants is effective for ethylene glycol as well as for propylene glycol, although the useful range of the ethylene glycol and the percentage of ethylene glycol having the longest WSET is different than for the propylene glycol composition of the preferred embodiment. Examples 10 to 14 are aqueous dilutions of Example 9. This illustrates that for the present invention, fluids, based upon ethylene glycol as well as the previously mentioned propylene glycol, can be diluted with water and still maintain prolonged WSET times.

As shown in Table 4, Examples 15 to 18 show that the present invention system of surfactants is effective in blends of propylene glycol and ethylene glycol. The performance of the blends containing 50% total propylene and ethylene glycol is similar to that of the examples with about 50% of either propylene glycol or ethylene glycol used alone. Therefore, it is expected that any examples that use one glycol or a blend of propylene glycol and ethylene glycol in any preparation, would have a similar performance. Table 4, Examples 19 to 21, show the blends at the extreme ends of the usage ranges, and these blends still had WSET times of 100 minutes, 120 minutes and 100 minutes, respectively. As shown in Table 4, the combined blend mixture percentage for Example 19 is 35.0% by weight where the propylene glycol is 34.0% by weight and the ethylene glycol is 1.0% by weight, the combined blend mixture percentage for Example 20 is 35.0% by weight where the propylene glycol is 1.0% by weight and the ethylene glycol is 34.0% by weight. The combined blend mixture percentage for Example 21 is 80.0% by weight where the propylene glycol is 1.0% by weight and the ethylene glycol is 79.0% by weight.

TABLE 3

| COMPONENT COMPOSITION | Example 9 | Example 10 | Example 11 | Example 12 | Example 13 | Example 14 |
|---|---|---|---|---|---|---|
| | % COMPONENT WEIGHT | | | | | |
| Ethylene Glycol | 80 | 65 | 60 | 55 | 50 | 35 |
| Water | 19.5 | 34.5 | 39.5 | 44.5 | 49.5 | 64.5 |
| Lower MW nonionic | 0.171 | 0.134 | 0.128 | 0.118 | 0.107 | 0.075 |
| Higher MW nonionic | 0.012 | 0.010 | 0.008 | 0.008 | 0.008 | 0.005 |
| Polycarboxylate | 0.184 | 0.160 | 0.138 | 0.123 | 0.115 | 0.081 |
| Potassium Hydroxide | * | * | * | * | * | * |
| WSET (in minutes) | 100 | 130 | 145 | 130 | 130 | 120 |

* Potassium hydroxide is added "as needed" to adjust the pH to a value between 6 and 8.

TABLE 4

| COMPONENT COMPOSITION | Example 15 | Example 16 | Example 17 | Example 18 | Example 19 | Example 20 | Example 21 |
|---|---|---|---|---|---|---|---|
| | % COMPONENT WEIGHT | | | | | | |
| Propylene Glycol | 10.0 | 20.0 | 30.0 | 40.0 | 34.0 | 1.0 | 1.0 |
| Ethylene Glycol | 40.0 | 30.0 | 20.0 | 10.0 | 1.0 | 34.0 | 79.0 |
| Water | 49.5 | 49.5 | 49.5 | 49.5 | 64.5 | 64.5 | 19.5 |
| Lower MW nonionic | 0.171 | 0.171 | 0.171 | 0.171 | 0.171 | 0.171 | 0.171 |
| Higher MW nonionic | 0.012 | 0.012 | 0.012 | 0.012 | 0.012 | 0.012 | 0.012 |
| Polycarboxylate | 0.184 | 0.184 | 0.184 | 0.184 | 0.184 | 0.184 | 0.184 |
| Potassium Hydroxide | * | * | * | * | * | * | * |
| WSET (in minutes) | 140 | 135 | 135 | 130 | 100 | 120 | 100 |

* Potassium hydroxide is added "as needed" to adjust the pH to a value between 6 and 8.

ADVANTAGES OF THE PRESENT INVENTION

Accordingly, an advantage of the present invention is that it provides for an improved deicing/anti-icing fluid composition which has a WSET time interval of not less than 2 hours when applied using conventional Type II and Type IV deicing/anti-icing vehicles and even if degraded by the use of non-selective equipment will give the standard 80 minutes WSET time, despite having its viscosity reduced by up to 70%.

Another advantage of the present invention is that it provides for a chemical composition having a distinct chemical mechanism for retarding the onset of re-freezing of water on the surface of the protective film of anti-icing fluid when applied to aircraft surfaces.

Another advantage of the present invention is that it provides for a fluid composition which does not rely upon increased thickness and volume of fluid to achieve its objective.

Another advantage of the present invention is that it provides for an improved deicing and anti-icing fluid composition that may be diluted with water and continue to retain a prolonged holdover of at least 80 minutes.

A further advantage of the present invention is the ease of application and the ability of the fluid composition to flow and level over the treated surface, eliminating the need to apply second or third coatings to ensure overall coverage, which can be the case for fluids of the prior art which rely on high viscosity and volume thickness to ensure adequate performance.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A deicing and anti-icing composition being a mixture for applying to aircraft surfaces, comprising:
    a) a base compound being propylene glycol in the range of 35.0% to 55.0% by weight of said deicing and anti-icing composition;
    b) a diluent in the form of water for use as a carrier fluid of said propylene glycol in the range of 44.0% to 65.0% by weight of said deicing and anti-icing composition;
    c) a first non-ionic surfactant agent having an HLB in the range of 4 to 17 and wherein said first surfactant agent is between 1 ppm to 0.5% by weight of said deicing and anti-icing composition;
    d) a second non-ionic surfactant agent having an HLB in the range of 5 to 18 and wherein said second surfactant agent is between 1 ppm to 0.5% by weight of said deicing and anti-icing composition; said second non-ionic surfactant agent having an HLB at least two (2) units higher than said first non-ionic surfactant agent and having a molecular weight greater than said first surfactant agent;
    e) an emulsifier in the form of a polycarboxylate compound present in the range of 1 ppm to 0.5% by weight of said deicing and anti-icing composition; and
    f) a pH control agent for maintaining the pH of said deicing and anti-icing composition between a value of 6 and 10; wherein said pH control agent is between 1 ppm to 1.0% by weight of said deicing and anti-icing composition.

2. A deicing and anti-icing composition in accordance with claim 1:
    a) wherein said base compound is in the range of 51.0% to 52.0% by weight of said deicing and anti-icing composition;
    b) wherein said diluent is in the range of 47.0% to 49.0% by weight of said deicing and anti-icing composition;
    c) wherein said first surfactant agent has an HLB in the range of 4 to 9 and is between 1 ppm to 0.5% by weight of said deicing and anti-icing composition;
    d) wherein said second surfactant agent has an HLB in the range of 13 to 18 and is between 1 ppm to 0.5% by weight of said deicing and anti-icing composition; and
    e) said emulsifier present in the range of 1 ppm to 0.5% by weight of said deicing and anti-icing composition.

3. A deicing and anti-icing composition in accordance with claim 1, wherein said first and second nonionic surfactant agents are selected from the group having radicals consisting of alcohols, alkylphenols, amines, fatty acids, proplylene oxide block polymers and ethylene oxide block polymers.

4. A deicing and anti-icing composition in accordance with claim 1, wherein said pH control agent is selected from the group consisting of potassium hydroxide, sodium hydroxide, organic amine bases, tolytriazole, and benzotriazole.

5. A deicing and anti-icing composition in accordance with claim 1, wherein said deicing and anti-icing composition has a pH value of greater than 7 so as to be alkaline.

6. A deicing and anti-icing composition in accordance with claim 5, wherein said deicing and anti-icing composition has a pH value in the range of between 7.01 to 10.00 so as to be alkaline.

7. A deicing and anti-icing composition in accordance with claim 1, wherein said deicing and anti-icing composition has a pH value of less than 7 so as to be acidic.

8. A deicing and anti-icing composition in accordance with claim 7, wherein said deicing and anti-icing composition has a pH value in the range of between 6.00 to 6.99 so as to be acidic.

9. A deicing and anti-icing composition in accordance with claim 1, further including an anti-corrosion compound to control the oxidative layer of said aircraft surfaces; wherein said anti-corrosion compound is in the range between 1 ppm to 1.0% by weight of said deicing and anti-icing composition.

10. A deicing and anti-icing composition in accordance with claim 9, wherein said anti-corrosion compound is selected from the group consisting of a tolytriazole, a benzotriazole, an alkoxylated butynediol, a thiourea, a propargyl alcohol, a sodium nitrate, and a butyne-1,4 diol and combinations thereof.

11. A deicing and anti-icing composition in accordance with claim 1, further including an anti-foam agent in the form of a silicone oil-based defoamer for preventing foaming of said deicing and anti-icing composition; wherein said anti-foam agent is in the range between 1 ppm to 0.5% by weight of said deicing and anti-icing composition.

12. A deicing and anti-icing composition in accordance with claim 1, further including a non-inflammability agent wherein said non-flammability agent is in the range between 1 ppm to 1.0% by weight of said deicing and anti-icing composition.

13. A deicing and anti-icing composition in accordance with claim 12, wherein said non-flammability agent is selected from the group consisting of tolytriazole and benzotriazole.

14. A deicing and anti-icing composition in accordance with claim 1, further including a water hardness control agent for the softening of said diluent water within said deicing and anti-icing composition; wherein said water hardness control agent is in the range between 1 ppm to 1.0% by weight of said and anti-icing composition.

15. A deicing and anti-icing composition in accordance with claim 14, wherein said water control hardness agent is selected from the group consisting of a sodium ethylene diamine tetraacetate, a sodium hydroxy ethyl ethylene diamine triacetate, a tolytriazole, a benzotriazole, a sodium polyphosphate, a sodium nitrilotriacetate, and a sodium pyrophosphate.

16. A deicing and anti-icing composition in accordance with claim 1, further including a color dye identification component in the form of a water-soluble dye for indicating that said deicing and anti-icing composition has been applied to said aircraft surfaces; wherein said color dye identification component is in the range between 10 ppb to 0.1% by weight of said deicing and anti-icing composition.

17. A deicing and anti-icing composition in accordance with claim 16, wherein said water-soluble dye is selected from the group consisting of a red-orange dye, a colorless to straw color dye and a green dye.

18. A deicing and anti-icing composition being a mixture for applying to aircraft surfaces, comprising:
   a) a base compound being ethylene glycol in the range of 35.0% to 80.0% by weight of said deicing and anti-icing composition;
   b) a diluent in the form of water for use as a carrier fluid of said ethylene glycol in the range of 20.0% to 65.0% by weight of said deicing and anti-icing composition;
   c) a first non-ionic surfactant agent having an HLB in the range of 4 to 17 and wherein said first surfactant is between 1 ppm to 0.5% by weight of said deicing and anti-icing composition;
   d) a second non-ionic surfactant agent having an HLB in the range of 5 to 18 and wherein said second surfactant is between 1 ppm to 0.5% by weight of said deicing and anti-icing composition; said second non-ionic surfactant agent having an HLB at least two (2) units higher than said first non-ionic surfactant agent and having a molecular weight greater than said first surfactant agent;
   e) an emulsifier in the form of a polycarboxylate compound present in the range of 1 ppm to 0.5% by weight of said deicing and anti-icing composition; and
   f) a pH control agent for maintaining the pH of said deicing and anti-icing composition between a value of 6 and 10; wherein said pH control agent is in the range between 1 ppm to 1.0% by weight of said deicing and anti-icing composition.

19. A deicing and anti-icing composition in accordance with claim 18:
   a) wherein said base compound is in the range of 59.0% to 63.0% by weight of said deicing and anti-icing composition;
   b) wherein said diluent is in the range of 37.0% to 41.0% by weight of said deicing and anti-icing composition;
   c) wherein said first surfactant agent has an HLB in the range of 4 to 9 and is between 1 ppm to 0.5% by weight of said deicing and anti-icing composition;
   d) wherein said second surfactant agent has an HLB in the range of 13 to 18 and is between 1 ppm to 0.5% by weight of said deicing and anti-icing composition; and
   a) said emulsifier present in the range of 1 ppm to 0.5% by weight of said deicing and anti-icing composition.

20. A deicing and anti-icing composition in accordance with claim 18, wherein said first and second nonionic surfactant agents are selected from the group having radicals consisting of alcohols, alkylphenols, amines, fatty acids, proplylene oxide block polymers and ethylene oxide block polymers.

21. A deicing and anti-icing composition in accordance with claim 18, wherein said pH control agent is selected from the group consisting of potassium hydroxide, sodium hydroxide, dipotassium phosphate, organic amine bases, tolytriazole, and benzotriazole.

22. A deicing and anti-icing composition in accordance with claim 18, wherein said deicing and anti-icing composition has a pH value of greater than 7 so as to be alkaline.

23. A deicing and anti-icing composition in accordance with claim 22, wherein said deicing and anti-icing composition has a pH value in the range of between 7.01 to 10.00 so as to be alkaline.

24. A deicing and anti-icing composition in accordance with claim 18, wherein said deicing and anti-icing composition has a pH value of less than 7 so as to be acidic.

25. A deicing and anti-icing composition in accordance with claim 24, wherein said deicing and anti-icing composition has a pH value in the range of between 6.00 to 6.99 so as to be acidic.

26. A deicing and anti-icing composition in accordance with claim 18, further including an anti-corrosion compound to control the oxidative layer of said aircraft surfaces; wherein said anti-corrosion compound is in the range between 1 ppm to 1.0% by weight of said deicing and anti-icing composition.

27. A deicing and anti-icing composition in accordance with claim 26, wherein said anti-corrosion compound is selected from the group consisting of a tolytriazole, benzotriazole, an alkoxylated butynediol, a thiourea, a propargyl alcohol, a sodium nitrate, and a butyne-1,4 diol and combinations thereof.

28. A deicing and anti-icing composition in accordance with claim 18, further including an anti-foam agent in the form of a silicone oil-based defoamer for preventing foaming of said deicing and anti-icing composition; wherein said anti-foam agent is in the range between 1 ppm to 0.5% by weight of said deicing and anti-icing composition.

29. A deicing and anti-icing composition in accordance with claim 18, further including a non-inflammability agent wherein said non-flammability agent is in the range between 1 ppm to 1.0% by weight of said deicing and anti-icing composition.

30. A deicing and anti-icing composition in accordance with claim 29, wherein said non-flammability agent is selected from the group consisting of tolytriazole and benzotriazole.

31. A deicing and anti-icing composition in accordance with claim 18, further including a water hardness control agent for the softening of said diluent water within said deicing and anti-icing composition; wherein said water hardness control agent is in the range between 1 ppm to 1.0% by weight of said deicing and anti-icing composition.

32. A deicing and anti-icing composition in accordance with claim 31, wherein said water control hardness agent is selected from the group consisting of a sodium ethylene diamine tetraacetate, a sodium hydroxy ethyl ethylene diamine triacetate, a tolytriazole, a benzotriazole, a sodium polyphosphate, a sodium nitrilotriacetate, and a sodium pyrophosphate.

33. A deicing and anti-icing composition in accordance with claim 18, further including a color dye identification component in the form of a water-soluble dye for indicating that said deicing and anti-icing composition has been applied to said aircraft surfaces; wherein said color dye identification component is in the range between 10 ppb to 0.1% by weight of said deicing and anti-icing composition.

34. A deicing and anti-icing composition in accordance with claim 33, wherein said water-soluble dye is selected from the group consisting of a red-orange dye, a colorless to straw color dye and a green dye.

35. A deicing and anti-icing composition being a mixture for applying to aircraft surfaces, comprising:
  a) a combination of propylene glycol and ethylene glycol being in the range of 35.0% to 80.0% by weight of said deicing and anti-icing composition, wherein the propylene glycol component does not exceed 55% by weight of said deicing and anti-icing composition and the ethylene glycol component does not exceed 79.9% by weight of said deicing and anti-icing composition;
  b) a diluent in the form of water for use as a carrier fluid for said combination of ethylene glycol and propylene glycol being in the range of 20.0% to 65.0% by weight of said deicing and anti-icing composition;
  c) a first non-ionic surfactant agent having an HLB in the range of 4 to 17 and wherein said first surfactant is between 1 ppm to 0.5% by weight of said deicing and anti-icing composition;
  d) a second non-ionic surfactant agent having an HLB in the range of 5 to 18 and wherein said second surfactant is between 1 ppm to 0.5% by weight of said deicing and anti-icing composition; said second non-ionic surfactant agent having an HLB at least two (2) units higher than said first non-ionic surfactant agent and having a molecular weight greater than said first surfactant agent;
  e) an emulsifier in the form of a polycarboxylate compound present in the range of 1 ppm to 0.5% by weight of said deicing and anti-icing composition; and
  f) a pH control agent for maintaining the pH of said deicing and anti-icing composition between a value of 6 and 10; wherein said pH control agent is in the range between 1 ppm to 1.0% by weight of said deicing and anti-icing composition.

36. A deicing and anti-icing composition in accordance with claim 35:
  a) wherein said base compounds are in the range of 45.0% to 65.0% by weight of said deicing and anti-icing composition;
  b) wherein said diluent is in the range of 35.0% to 55.0% by weight of said deicing and anti-icing composition;
  c) wherein said first surfactant agent has an HLB in the range of 4 to 9 and is between 1 ppm to 0.5% by weight of said deicing and anti-icing composition;
  d) wherein said second surfactant agent has an HLB in the range of 13 to 18 and is between 1 ppm to 0.5% by weight of said deicing and anti-icing composition; and
  e) said emulsifier present in the range of 1 ppm to 0.5% by weight of said deicing and anti-icing composition.

37. A deicing and anti-icing composition in accordance with claim 35, wherein said first and second nonionic surfactant agents are selected from the group having radicals consisting of alcohols, alkylphenols, amines, fatty acids, propylene oxide block polymers, and ethylene oxide block polymers.

38. A deicing and anti-icing composition in accordance with claim 35, wherein said pH control agent is selected from the group consisting of potassium hydroxide, sodium hydroxide, organic amine bases, tolytriazole, and benzotriazole.

39. A deicing and anti-icing composition in accordance with claim 35, wherein said deicing and anti-icing composition has a pH value of greater than 7 so as to be alkaline.

40. A deicing and anti-icing composition in accordance with claim 39, wherein said deicing and anti-icing composition has a pH value in the range of between 7.01 to 10.00 so as to be alkaline.

41. A deicing and anti-icing composition in accordance with claim 35, wherein said deicing and anti-icing composition has a pH value of less than 7 so as to be acidic.

42. A deicing and anti-icing composition in accordance with claim 41, wherein said deicing and anti-icing composition has a pH value in the range of between 6.00 to 6.99 so as to be acidic.

43. A deicing and anti-icing composition in accordance with claim 35, further including an anti-corrosion compound to control the oxidative layer of said aircraft surfaces; wherein said anti-corrosion compound is in the range between 1 ppm to 1.0% by weight of said deicing and anti-icing composition.

44. A deicing and anti-icing composition in accordance with claim 43, wherein said anti-corrosion compound is selected from the group consisting of a tolytriazole, a benzotriazole, an alkoxylated butynediol, a thiourea, a propargyl alcohol, a sodium nitrate, a butyne-1,4 diol and combinations thereof.

45. A deicing and anti-icing composition in accordance with claim 35, further including an anti-foam agent in the form of a silicone oil-based defoamer for preventing foaming of said deicing and anti-icing composition; wherein said anti-foam agent is in the range between 1 ppm to 0.5% by weight of said deicing and anti-icing composition.

46. A deicing and anti-icing composition in accordance with claim 35, further including a non-flammability agent wherein said non-flammability agent is in the range between 1 ppm to 1.0% by weight of said deicing and anti-icing composition.

47. A deicing and anti-icing composition in accordance with claim 46, wherein said non-flammability agent is selected from the group consisting of tolytriazole and benzotriazole.

48. A deicing and anti-icing composition in accordance with claim 35, further including a water control hardness agent for the softening of said diluent water within said deicing and anti-icing composition; wherein said water hardness control agent is in the range between 1 ppm to 1.0% by weight of said deicing and anti-icing composition.

49. A deicing and anti-icing composition in accordance with claim 48, wherein said water control hardness agent is selected from the group consisting of a sodium ethylene diamine tetraacetate, sodium hydroxy ethyl ethylene diamine triacetate, a tolytriazole, a benzotriazole, a sodium polyphosphate, a sodium nitrilotriacetate, and a sodium pyrophosphate.

50. A deicing and anti-icing composition in accordance with claim 35, further including a color dye identification component in the form of a water-soluble dye for indicating that said deicing and anti-icing composition has been applied to said aircraft surfaces; wherein said color dye identification component is in the range between 10 ppb to 0.1% by weight of said deicing and anti-icing composition.

51. A deicing and anti-icing composition in accordance with claim 50, wherein said water-soluble dye is selected from the group consisting of a red-orange dye, a colorless to straw color dye and a green dye.

* * * * *